United States Patent [19]
van den Bosch

[11] 3,975,762
[45] Aug. 17, 1976

[54] SPECTROSCOPICAL METHOD AND APPARATUS USING TV SCANNING TECHNIQUES

[76] Inventor: Francois J. G. van den Bosch, 11 Hillcrest Road, Cedar Grove, N.J. 07009

[22] Filed: Apr. 9, 1975

[21] Appl. No.: 566,231

[52] U.S. Cl. .................................................. 358/81
[51] Int. Cl.² ........................................ H04N 9/42
[58] Field of Search ................. 358/81, 82; 178/6.8

[56] References Cited
UNITED STATES PATENTS

| | | |
|---|---|---|
| 3,258,528 | 6/1966 | Oppenheimer ........................ 358/82 |
| 3,628,014 | 12/1971 | Grubic ................................. 358/81 |
| 3,806,633 | 4/1974 | Coleman .............................. 358/81 |

*Primary Examiner*—Howard W. Britton
*Attorney, Agent, or Firm*—Watson, Cole, Grindle & Watson

[57] ABSTRACT

Apparatus for reducing the bandwidth of video signal data by gating portions of the video signal selected by coincidence circuits controlled by individual interleaved pulse trains.

5 Claims, 5 Drawing Figures

SPECTROSCOPICAL METHOD AND APPARATUS USING TV SCANNING TECHNIQUES

This invention relates to the use of TV scanning techniques for spectroscopical analysis apparatus, and in particular to the gating of signals representing narrow band light images from a high resolution TV camera to a video display or recording apparatus.

BACKGROUND OF THE INVENTION

Analytical systems using chemical spectroscopical methods for chemical identification of elements involving selective absorption techniques are well known. In one such method a chemical is evaporated or combusted in the flame of a known gas (referred to as flame photometry) such as hydrogen, and the emission spectra thus obtained are detected and measured by photoelectric devices. In another well-known method, the substance examined and identified is diluted in a known liquid which is then placed in a cuvette and exposed to a concentrated source of monochromatic light, which, after passing through the substance where some of its energy in a certain bandwidth is absorbed, is then detected by a photoelectric detector or sensor. Many refinements and improvements have been made to the individual components of spectroscopical analysis systems. For example, the monochromaticity of the light source and the sensitivity of the photoelectric devices themselves have both been improved. However, all such improvements in techniques require the use of inert material.

SUMMARY OF THE INVENTION

The present invention enables the spectroscopic analysis of live materials, which may be unstained and wherein the observation may be performed in situ. While the present invention utilizes conventional absorption techniques, it considerably broadens and enhances such techniques by the application and utilization of TV scanning techniques.

In one preferred form of the invention, an optical microscope is used with a well-known high resolution TV camera, for example as is described in applicant's co-pending application Ser. No. 379,099, filed July 13, 1973, entitled "High Resolution Color TV Microscope Apparatus", now U.S. Pat. No. 3,913,128, issued Oct. 14, 1975. In such a system, a radiation source, such as a high pressure Xenon light source, is utilized to generate narrow monochromatic bandwidths using interference filters, diffraction gratings or well-known refraction devices, to illuminate the specimen. The high resolution TV camera detects the image of the monochromatic light reflected or transmitted through the specimen. For example, a system wherein the light is passed through the specimen is disclosed in U.S. Pat. No. 3,507,987, relating to an ultra-violet microscope system. The techniques of irradiating a specimen illustrated in FIG. 3A of the aforementioned U.S. Pat. No. 3,913,128 and in FIG. 2 of the aforementioned U.S. Pat. No. 3,507,987 are incorporated herein by reference.

The monochromators illustrated in the aforementioned co-pending application and patent may be modified to enable one angstrom of light at a time to be sequentially emitted therefrom. If a bandwidth from, for example, 2600 angstroms to 8000 angstroms is covered in one angstrom increments, there will be 5400 narrow bandwidth light spectra which can be utilized to illuminate the specimen. In the present invention each successive light spectra is correlated with the field rate of a television scanning system to provide a complete raster covered by the successive 1 angstrom bandwidth illumination of the specimen. The resultant video signal contains considerably more information than has ever been able to be obtained from any spectroscopic apparatus. For example, using a ninety field scanning rate requires only 1 minute to cover a bandwidth of 5400 angstroms.

The present invention relates to the manner in which the images are recorded. High resolution TV images utilizing scanning rates of at least 60 fields a second, require bandwidths in the order of 30 to 40 megahertz, thereby precluding the recording or storage of such signals by presently known video memory systems, inasmuch as the bandwidth exceeds their present capabilities. However, it is known that a reduction of the field rate of the TV scanning system will also reduce the video bandwidth. For example, an interlaced TV system, having 1,000 lines per frame, has 500 lines per field. At 60 fields per second it would require a bandwidth of only 15 megahertz. Decreasing the field rate to about 10 fields would further reduce the video bandwidth to approximately 2.5 megahertz, which is within the bandwidth capabilities of presently available TV recording systems. In accordance with the present invention, successive portions of the line information per field of a TV scanning system are gated, at a rate of for example 90 fields per second, resulting in a bandwidth of less than 1 megahertz. In an 800 line high resolution 90 field system, each field comprises only 400 lines in one application. The first 100 lines of each field, and each successive 100 lines of the next fields, are gated in succession through the TV system and recorded to provide an image equal to that of the original image, with the same resolution as obtained by the original 90 fields. Even gating 150 lines for each field would only increase the bandwidth requirements to approximately 2.2 megahertz, which is still well within the recording capabilities of presently available commercial TV recording systems. Of course, in such a system the field rate would increase to 30 fields per second.

The aforementioned technique may be applied to analytical medicine, thereby enabling a surgeon to identify portions of a cell in situ while the patient is on the operating table. The video signals from such a system may then be stored either partially or totally. The video signal may be stored at a relatively low frequency by integrating the video signal of each field and storing the integrated field video signals successively. Such signals could be recorded by a pen recording system thereby providing a complete absorption spectrogram of the specimen. However, in a preferred embodiment of the present invention the video signals which have been integrated are displayed on a dual input display device, such as a double beam oscilloscope where one beam presents or represents a normal value and the other beam represents the integrated video signals.

A further aspect of the present invention provides apparatus to enable the operator, such as a surgeon, to pinpoint the portion of a cell or specimen that is desired to be chemically identified. A special gating system utilizes two gates, one for producing an illuminated spot superimposed on a regular scanning raster of a TV system. The spot may be moved by suitable controls of two delay multivibrators, one for the vertical and one for the horizontal position of the spot. One multivibrator receives its signal from the horizontal sync pulse, while the other receives a signal from the vertical sync pulse. By adjusting both the horizontal and vertical multivibrators, the spot can be moved all over the specimen such as to cover the entire image of the specimen which may be displayed on a TV monitor, for example as described in the aforementioned U.S. Pat. No. 3,913,128. The spot is sufficiently small to cover minute portions of a displayed image, and with the use of a suitable optical microscope may generate the image of just one cell, representing either tissue or blood, for example. The use of the spot illumination technique eliminates the necessity of integrating the video signal of each individual field of the TV scanning system as previously described above.

The present invention also has application in the field of optical densitometry, with a special application to the generation of images by electron microscope techniques. It is known that the limit of resolution of a light microscope is approximately 1000 angstroms and its maximum useful magnification is approximately 2000. In order to obtain higher resolution than 1000 angstroms, the electron microscope has been developed and improved. It is known that all matter is opaque to electrons and consequently the specimen must be mounted on a very thin membrane and the intensity of the images of the object represents a measure of the transmission properties of the corresponding portion of the object. Thus, the televesion scanning techniques of this invention could also be used to isolate a minute portion of an object, the optical density of which could then be obtained by its relation to a known chemical and/or a known molecular identification system or technique. In a succession of different preparations of the same specimen, for example a bacteria or a virus, the minute data selection of the same area will enable a spatial optical density identification of the specimen and can also be related to a chemical identification utilizing for example known spectrophotometric techniques.

In a further embodiment of the invention, the video signals may be processed through an analog-to-digital converter and the resulting digital signals stored, for example, by tape, pen recorder or computer.

OBJECTS OF THE INVENTION

It is a primary object of the invention to provide improved method and apparatus for gating signals representing narrow band light images from a high resolution TV camera to a recording or display apparatus.

It is a further object of the present invention to provide improved apparatus for the spectroscopical analysis of a specimen wherein a selected portion of the signals representing narrow band light images of the specimen are generated for storage or display.

It is yet a further object of the present invention to provide gating apparatus for improving the resolution of the signals representative of an image in a spectroscopic analytical system by the application of TV scanning techniques.

It is still a further object of the present invention to provide a circuit for gating video signals representing a spectroscopic image of a specimen to enhance the resolution of an image assembled from the gated signals.

DETAILED DESCRIPTION

In color television systems the reproduction of the colored picture is generally achieved by a cathode ray tube, or viewing tube, having three or more cathodes, each of which is respectively responsible for a particular color. In a well-known system using three colors, namely, red, green and blue, each of the colors is produced by an individual cathode gun. In order to obtain high fidelity color reproduction in such a system, it is absolutely essential that each gun be only "open" or "firing" when that actual color is required, and at all other times it must be completely cut-off. Such a requirement is even more important in color sequential systems where the different colors are successively produced.

Figure 1A:
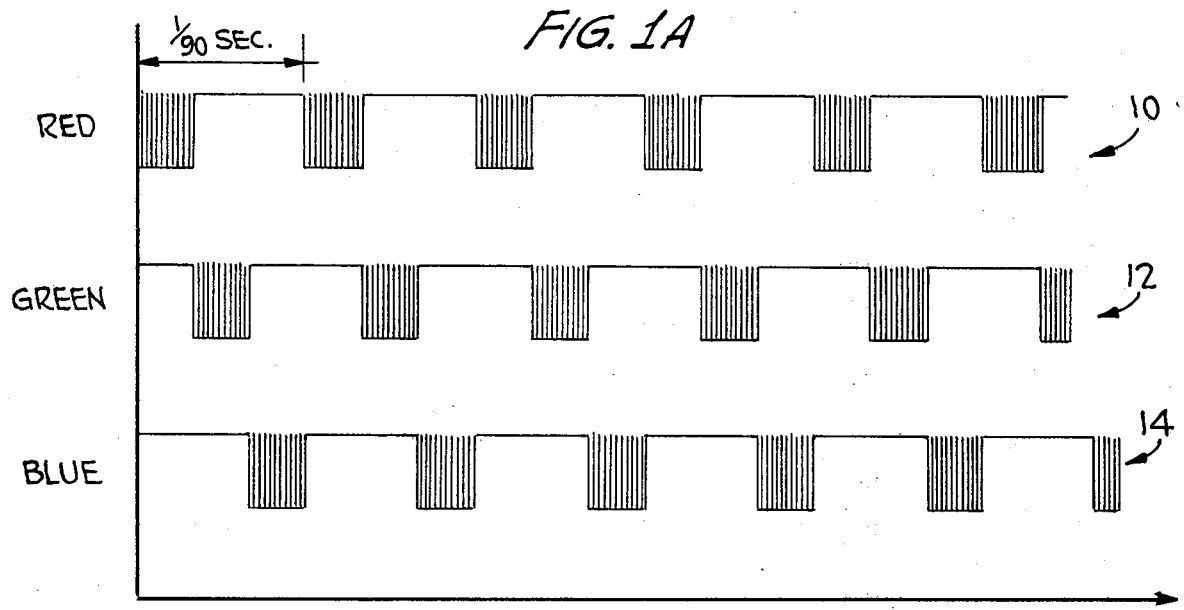
FIGS. 1A and 1B illustrate the principle of the field sequential operation of the present invention.
Figure 1B:
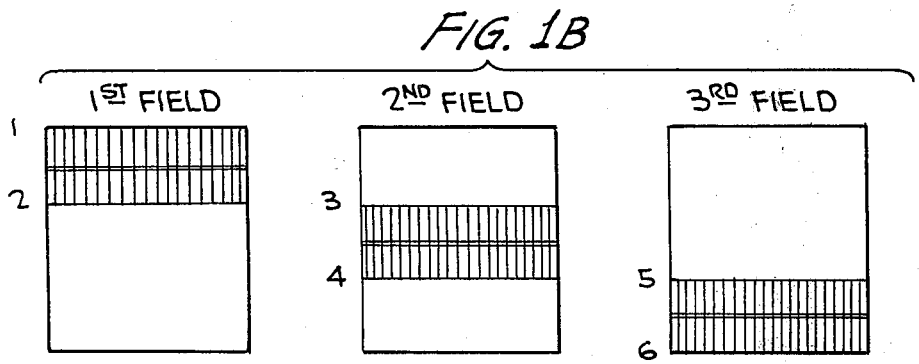

In FIG. 1A, three sets of interleaved pulses over a period of 1/90th of a second, corresponding to a 90 field video monitoring and display system as described in the aforementioned U.S. Pat. No. 3,913,128, are illustrated. Each of the pulse trains 10, 12 and 14 is associated with a particular color such as red, green and blue corresponding to the three colors of an interlaced color TV system. The three pulse trains are cyclically repeated at 90 Hertz, which correponds to a 90 field system and it is recognized that other cyclical frequencies may be employed as described. Each of the negative pulses in pulse trains 10, 12 and 14 includes, for example, 100 control pulses and these pulse trains are applied to the respective coincidence gates illustrated in FIG. 2 for the purpose of sequentially exciting the appropriate color gun in a standard well-known color TV monitor. As illustrated in FIG. 1B, pulse train 10 may be employed to select 100 lines from the first field; pulse train 12 may be employed to select 100 lines from the second field; and pulse train 14 may be employed to select 100 lines from the third field. Assuming that the TV system has 1,000 horizontal lines, then, in accordance with the foregoing example, the bandwidth of the video signal would have been reduced by a factor of ten. For example, if the broad band video signal had a bandwidth of 32 MHz, its bandwidth after the successive 100 line selection from the successive fields would reduce the video bandwidth to 3.2 MHz.

Figure 2:
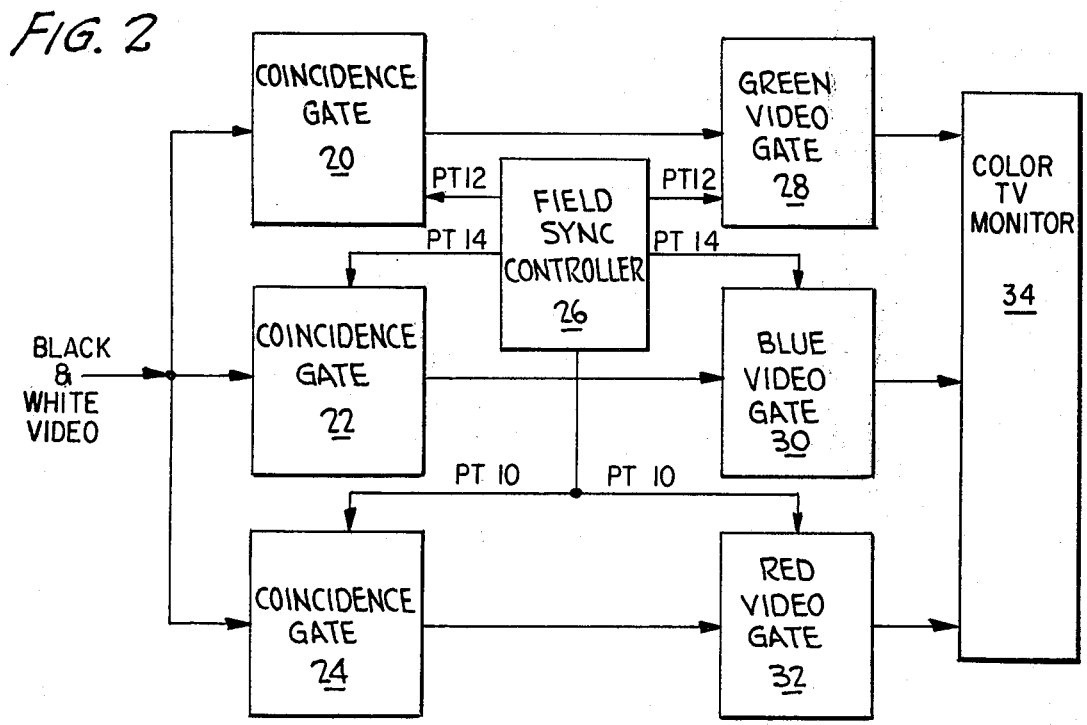
FIG. 2 is a block diagram representation of an embodiment of the invention.

With respect to FIG. 2, the broad-band black and white video signals are simultaneously input to coincidence gates 20, 22 and 24. The coincidence gates are controlled by field synchronization controller 26, which generates the pulse trains 10, 12 and 14 of FIG. 1A. The output of each of coincidence gates 20, 22 and 24 represents a selected portion of the broad band video input signal. These output signals are then gated by respective gates 28, 30 and 32. Coincidence gates 20, 22, 24, 28, 30 and 32 may each comprise a NAND gate, or other suitable logic gate circuit. As shown in FIG. 2, the video gates 28, 30 and 32 are each controlled by the same synchronization signals as are coincidence gates 20, 22 and 24, respectively. The respective outputs of video gate 28, video gate 30, and video gate 32 are provided to the respective and corresponding color guns in a color TV monitor 34. The reduced bandwidth signals from coincidence gates 20, 22 and 24 may be amplified, or video gates 28, 30 and 32 may provide any necessary amplification of the video signals.

Figure 3:
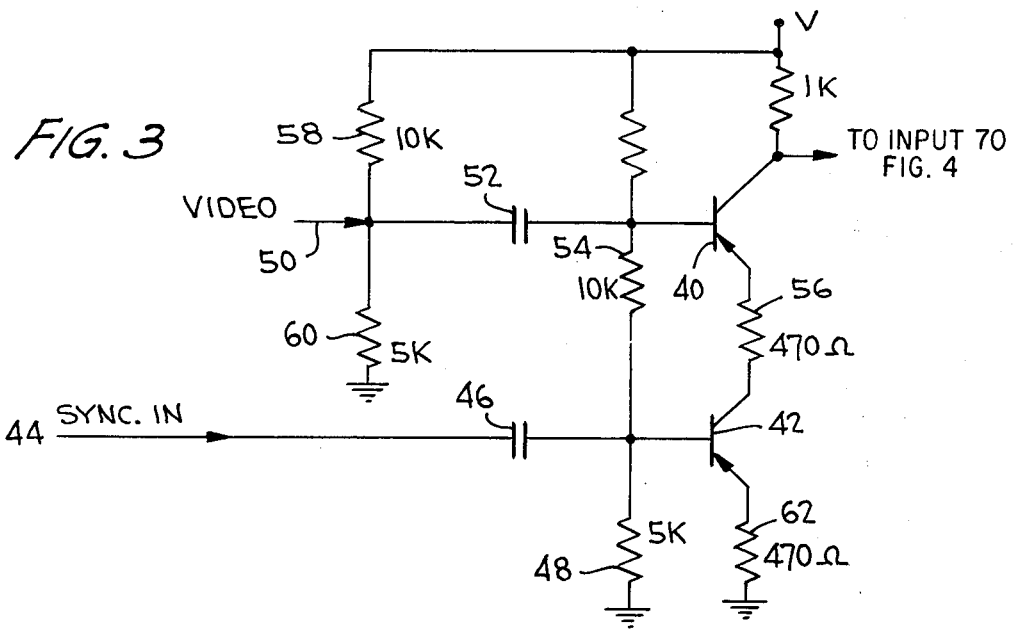
FIG. 3 is a preferred circuit embodiment of the coincidence gates of FIG. 2.
Figure 4:
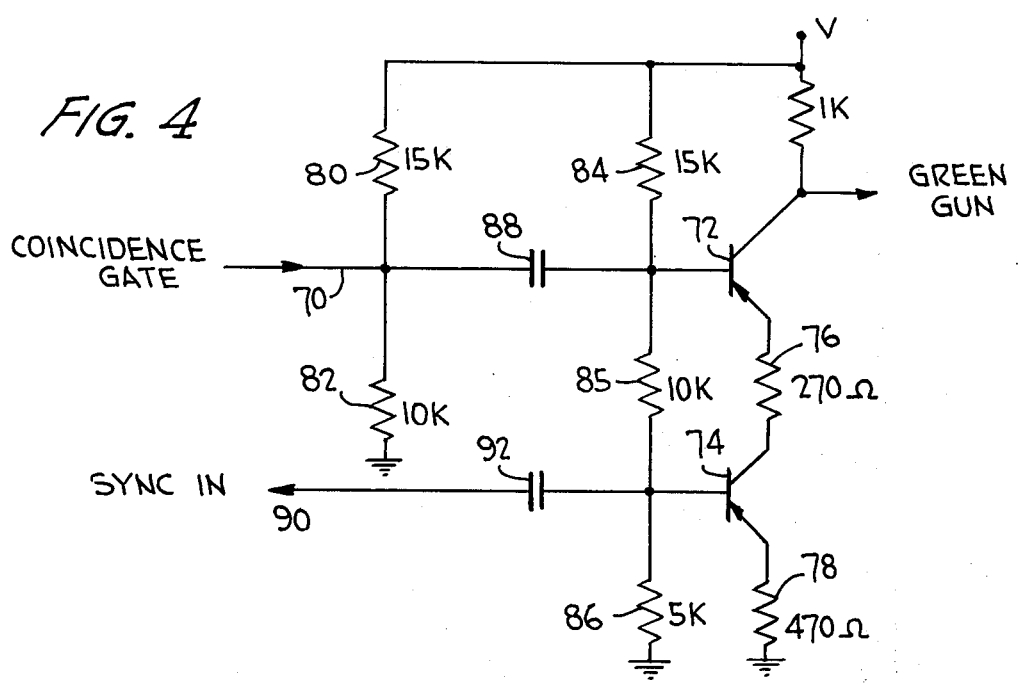
FIG. 4 is a preferred circuit embodiment of an exemplary color video gate shown in FIG. 2.

While the coincidence and video gates illustrated in FIG. 2 may comprise suitable NAND logic gates, a preferred embodiment of such circuits is illustrated in FIGS. 3 and 4 respectively. A novel feature of the present invention is the use of the well-known cascode type circuit as either a coincidence gate or a video gate. With respect to FIG. 3, a typical coincidence gate comprises transistors 40, 42. The field synchronization controller signal is applied to terminal 44 and to the base of the transistor 42 through capacitor 46 and resistor 48. The selected portion of the black and white video signal is input through terminal 50 and to the base transistor 40 through capacitor 52 and resistor 54. The collector of transistor 42 is connected to the emitter of transistor 40 by resistor 56. Additional proper biasing of the bases of transistors 40, 42 is privided by resistors 58 and 60. The emitter transistor 42 is connected to ground through resistor 62. The resistors illustrated in FIG. 3 have representative values as indicated. The output of the coincidence gate is taken from the collector of transistor 40.

With reference to FIG. 4, the output of the coincidence gate previously described is provided as an input to terminal 70 of the video gate illustrated, which is identical to the coincidence gate previously described, with the exception of the resistance values. Thus, the emitter of transistor 72 is connected to the collector of transistor 74 by resistor 76. The emitter of transistor 74 is grounded through resistor 78. The proper biasing of the respective bases of transistor 72 and 74 is afforded by resistors 80, 82, 84, 85 and 86 which have the representative component values as indicated in the Figure. The video signal terminal 70 is connected to the base of transistor 72 by capacitor 88, and the synchronization signal is connected to terminal 90, which in turn is connected to the base of transistor 74 by capacitor 92. The video output signal is taken from the collector of transistor 72 and provided to a respective one of the three guns of a standard TV monitor (not shown).

It will be readily apparent to those having skill in the art to which the invention is directed that if a wide black and white video signal is input to terminal 50 of the coincidence gate illustrated in FIG. 3, that the operation of that coincidence gate as well as the video gate illustrated in FIG. 4 will provide at the collector of transistor 72 a portion of the total bandwidth of the black and white video signal. If, for example, the output of transistor 72 is connected to the green gun of a standard TV monitor, and similar video signals from the other video gates having outputs which represent other successive portions of the black and white video signal are connected respectively to the blue and red guns of the TV monitor, there will be displayed on that TV monitor a colored representation of the black and white video signals. Further, an important feature of the invention is that the resolution of the image represented by the black and white video signals will not be impaired by the circuitry of the present invention.

What is claimed is:

1. Apparatus for reducing the bandwidth of video signal data for display, comprising:
   control means for generating sequential first, second and third independent interleaved binary pulse trains, each of said pulse trains including a plurality of control pulses;
   first gating means responsive to said first pulse train for generating a first output signal including a selected portion of said video signal data; second gating means responsive to said second pulse train for generating a second output signal including a selected portion of said video signal data other than that portion included in said first output signal;
   third gating means responsive to said third pulse train for generating a third output signal including a selected portion of said video signal data other than that portion included in said first and second output signals; and
   fourth, fifth and sixth gating means for respectively connecting said first, second and and third output signals to respective color guns of a color TV display monitor.

2. Apparatus as in claim 1 wherein said color TV display monitor includes green, blue and red guns and said fourth, fifth and six gating means connects said first, second and third output signals respectively to said green, blue and red guns.

3. Apparatus as in claim 1 wherein said first and fourth, said second and fifth, and said third and sixth gating means, respectively, are each a cascode circuit; said first, second and third gating means including a first input responsive to said video signals and a second input responsive to a respective one of said first, second and third pulse trains; each said fourth, fifth and sixth gating means including a first input responsive to said first, second and third output signals respectively, and a second input responsive to a respective one of said first, second and third pulse trains for generating respective fourth, fifth and sixth video output signals.

4. Apparatus as in claim 3 wherein each of said first, second, third, fourth, fifth, and sixth gating means includes first and second transistors each having base, emitter and collector electrodes, said first and second inputs being connected respectively to the base of said first and second transistors, the collector of said second transistor being connected to the emitter of said first transistor and said output signal being generated at the collector of said first transistor.

5. Apparatus as in claim 4 wherein said first second and third pulse trains each has a period of 1/90th of a second and 100 control pulses.

\* \* \* \* \*